United States Patent Office 2,811,413
Patented Oct. 29, 1957

2,811,413

FLUORINATION PROCESS

Thomas S. McMillan, Barnwell County, S. C., assignor to the United States of America as represented by the United States Atomic Energy Commission No Drawing. Application May 20, 1953,
Serial No. 356,297

4 Claims. (Cl. 23—14.5)

My invention relates to a process and composition for the fluorination of metals, and more particularly, the fluorination of uranium.

Several methods have previouly been employed for the conversion of metals to their fluorides. In one such method involving uranium, the uranium is converted to uranyl nitrate, which is then converted to the hexafluoride by the following multi-step procedure:

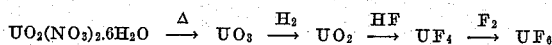

Disadvantages of this method and other related methods involving the stepwise conversion of uranium to uranium hexafluoride include rather high process costs, the use of complicated equipment and excessive lengths of time.

Another method previously employed involves the direct conversion of uranium to uranium hexafluoride with gaseous chlorine trifluoride. This reaction will proceed at about 165° C. and goes very well at about 300° C. However, the procedure is very difficult to control, may subject operating personnel to great risks, and creates considerable heat transfer and equipment corrosion problems.

It is known that uranium and other metals will react with liquid chlorine trifluoride to form their respective fluorides, but the reaction proceeds at such a slow rate as to make its utilization impractical.

It is, therefore, an object of my invention to provide an improved process for the fluorination of metals.

Another object of my invention is to provide an improved process for the direct conversion of uranium to uranium hexafluoride.

Another object of my invention is to provide an improved process for the direct conversion of uranium to uranium hexafluoride with a halogen trifluoride.

Still another object is to provide an improved composition for the fluorination of metals.

A further object is to provide an improved composition for the direct conversion of uranium to uranium hexafluoride.

Additional objects and advantages of my invention will be apparent from the following description.

My present invention, therefore, relates to an improvement in a process for fluorinating a metal by means of a halogen trifluoride, which comprises contacting said metal with a liquid mixture comprising essentially said halogen trifluoride together with hydrogen fluoride.

Thus, I find that a suitable mixture of a halogen trifluoride together with hydrogen fluoride reacts with uranium at a significantly faster rate than does a halogen trifluoride alone.

While my fluorinating mixture gives tremendously improved results, the reaction mechanism is not known. It appears, however, that hydrogen fluoride functions as a catalyst since its original and final concentration is the same in any particular reaction. The overall reaction appears to be as follows:

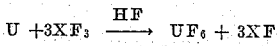

Bromine trifluoride is suitable for use in my invention while chlorine trifluoride is preferred. Although my fluorinating mixture may be satisfactorily used with a number of metals, for convenience my specification will hereinafter be specifically illustrated with respect to the fluorination of uranium metal employing the preferred chlorine trifluoride as the fluorinating reagent.

As used hereinafter and in the appended claims the term "mole ratio" is intended to designate the number of moles of $ClF_3$ per mole of HF.

I find that a mixture of $ClF_3$ and HF in a mole ratio of about 0.15 to about 2.5 gives particularly satisfactory results while a ratio of about 0.3 is preferred. Thus, liquid $ClF_3$ in the absence of any HF, and in the initial absence of any $UF_6$ product in the reaction solution, will react with uranium at 30° C. to form only about 20 mg. $UF_6$ per hour per square centimeter of uranium surface area, while, under identical circumstances, a $ClF_3/HF$ mixture in a mole ratio of about 1.53 will react with uranium to form about 415 mg. $UF_6$ per hour per square centimeter of uranium surface area.

The following tables, I and II, illustrate the rates of reaction of uranium with varying mole ratios and with certain concentrations of $UF_6$.

TABLE I

*Influence of uranium hexafluoride upon the rate of reaction at 30° C.*

| Molar Ratio, $ClF_3/HF$ | Mole Percent $UF_6$, percent | Rate of Reaction, mg. $UF_6$/sq.-cm./hr. |
|---|---|---|
| 0.14 | 0.0 | 202 |
| 0.14 | 3.8 | 138 |
| 0.28 | 0.0 | 173 |
| 0.28 | 1.5 | 265 |
| 0.28 | 3.8 | 355 |
| 0.29 | 0.0 | 147 |
| 0.29 | 2.9 | 207 |
| 0.98 | 0.0 | 300 |
| 0.98 | 5.1 | 150 |
| 1.53 | 0.0 | 415 |
| 1.53 | 8.6 | 164 |
| 1.53 | 22.3 | 90 |
| 1.77 | 0.0 | 299 |
| 1.77 | 10.2 | 125 |
| 2.03 | 0.0 | 237 |
| 2.03 | 10.8 | 52 |
| 2.03 | 18.5 | 39 |

TABLE II

*Rate of reaction at 30° C. between uranium metal and chlorine trifluoride-hydrogen fluoride mixtures saturated at 25° C. with uranium hexafluoride*

| Mole Ratio, $ClF_3/HF$ | Rate of Reaction, mg. $UF_6$/sq. cm./hour |
|---|---|
| 0.14 | 138 |
| 0.26 | 225 |
| 0.28 | 355 |
| 0.29 | 207 |
| 0.34 | 160 |
| 0.34 | 125 |
| 0.35 | 144 |
| 0.47 | 144 |
| 1.04 | 144 |
| 1.53 | 90 |
| 1.57 | 85 |
| 2.03 | 52 |

On inspection of the data in the above tables it may be noted that in the initial stages of the reaction where only relatively small amounts of $UF_6$ product are in solution (for example, about 0 mole percent to about 5 mole percent), the employment of a mole ratio of about 1.5 results in the most rapid dissolution. However, as the reaction progresses and more $UF_6$ is in solution it is found that a mole ratio of about 0.3 then produces the fastest dissolution rates.

It was observed that with all mole ratios within the illustrated range, except for a mole ratio of about 0.3, the rate of reaction decreases with time at a faster rate than can be attributed to changes in the concentration of the fluorinating liquid or to changes in the surface area of the uranium which occurs during the reaction period. It is, therefore, believed that, for some unknown reason, the presence of the $UF_6$ product in the solution has an inhibiting effect on the reaction between uranium and a $ClF_3/HF$ mixture with all mole ratios except one of about 0.3.

When a system is employed which removes the $UF_6$ product as it is formed, or if only a relatively small amount of uranium is to be dissolved, the utilization of a mole ratio of approximately 1.5 is preferable. However, since in many common operations, such as batch dissolutions, the $UF_6$ product is permitted to remain in solution until the conclusion of the reaction, the employment of the 0.3 mole ratio is generally more advantageous.

In a batch dissolution advantage may be taken of the faster dissolution initially obtainable with a mole ratio of about 1.5 until the formation of $UF_6$ inhibits its effectiveness. For this purpose an amount of a $ClF_3/HF$ mixture in a mole ratio of about 1.5 and not greatly in excess of stoichiometric requirements may suitably be employed initially. At the point in the dissolution when the $UF_6$ product would retard the reaction, a large stoichiometric excess of a $ClF_3/HF$ mixture in a mole ratio somewhere below 0.3 may then be added to the reaction mixture to bring the average mole ratio of the total $ClF_3/HF$ mixture to 0.3. However, in view of the procedural difficulties involved, and the minor consequent improvement in the rate of dissolution, I prefer to employ the 0.3 mole ratio in all operations where relatively large amounts of $UF_6$ product will accumulate in the solution.

Since the importance of the maintenance of the proper $ClF_3/HF$ mole ratio is seen from the foregoing, and since the concentration of the HF catalyst remains constant while the $ClF_3$ is being consumed in reaction with uranium, it is apparent that large stoichiometric excesses of the fluorinating mixture should be employed to assure reasonable constancy of the mole ratio. Thus, we find that the mole ratio may be maintained reasonably constant throughout a dissolution if stoichiometric excesses of about 500% to about 1500% are employed while an excess of about 1000% is preferred.

Although the temperature employed is not critical in the practice of my invention, it is noted that the reaction rate increases with temperature and that the major portion of the increase occurs between 45° C. and 60° C. While the reaction proceeds smoothly and rapidly at higher temperatures, the greater pressures reached may increase hazards to operating personnel since chlorine trifluoride is corrosive and explodes on contact with many ordinary materials. Relatively low temperatures are preferred, therefore, unless a particularly fast dissolution is required in which event strong equipment should be used. I find that a temperature in the general range of 30° C. gives satisfactory rates of dissolution while still permitting relatively safe operation.

It is preferred to conduct the process under anhydrous conditions to prevent side reactions and minimize corrosion.

In a preferred procedure for fluorinating metals, particularly uranium, the metal is contacted with a stoichiometric excess of a liquid mixture comprising essentially $ClF_3$ together with HF in a mole ratio of about 0.3 while maintaining the temperature at about 30° C., until the metal is substantially completely reacted.

When employing my invention to convert uranium to uranium hexafluoride, the uranium hexafluoride may be recovered from the resulting reaction mixture by the following general method. The reaction mixture may be cooled to about 30° C. to solidify the $UF_6$ whereupon the remaining unreacted chlorine trifluoride-hydrogen fluoride mixture and the resulting chlorine monofluoride may be removed from the reactor as vapors. The temperature of the reaction mixture may then be raised to about 60° C., to transfer the uranium hexafluoride by sublimation to a distillation apparatus from which it may be distilled at about 66° C. to substantially completely separate it from any trace amounts of remaining impurities.

The following examples will illustrate my invention in greater detail.

EXAMPLE I

The apparatus employed was of a conventional nature and consisted essentially of a nickel reactor equipped with a viewing window for observation purposes, a manifold equipped with absolute and differential pressure gauges, and a waste disposal system.

To the reactor was attached a reflux condenser and a dispensing tube containing the fluorinating mixture to be employed. Connecting lines from the manifold were attached to the top and the bottom of the reactor and to the top of the condenser. Temperature measurements were made with a thermocouple which was inserted into the reactor.

The disposal system consisted of a large chemical trap filled with four to eight mesh soda lime, a cold trap immersed in liquid nitrogen, and a series 1405 Welch vacuum pump filled with fluorocarbon oil.

After the apparatus had been assembled, a solid cylinder of uranium was immersed in 35% nitric acid for 10 minutes to remove any surface oxidation, and then rinsed and wiped dry. The resulting cleaned uranium, which was about one-half inch in length, 1.1 inches in diameter, 23 square centimeters in surface area, and 144.0 grams in weight was then placed in the reactor. The system was evacuated, flushed with helium and re-evacuated and leak tested under vacuum and under 25 p. s. i. g. helium pressure.

After a further half hour of pumping, two successive charges of gaseous chlorine trifluoride were admitted to remove any traces of moisture. Following this precautionary measure the gas was pumped out and helium was admitted to the system until the pressure was slightly in excess of that exerted by the fluorinating mixture at 30° C. The reactor was then warmed to about 30° C. and Dry Ice loaded into the jacket of the reflux condenser. Next, a 1000% stoichiometric excess of a liquid mixture of chlorine trifluoride together with hydrogen fluoride in a mole ratio of about 0.3 was admitted into the reactor from the dispensing tube. The temperature of the reactor was held at about 30° C. during the reaction period.

After 30 minutes the liquid in the reactor was allowed to blow into a receiver which was cooled with Dry Ice. The dry ice was removed from the reflux condenser and the reactor and manifold were evacuated for a period of an hour. Then the system was flushed four or five times with helium and brought to atmospheric pressure with helium. The reactor was dismantled, the unreacted uranium removed and carefully wiped free of dust particles and weighed.

The average specific rate of reaction in terms of the amount of uranium hexafluoride produced per unit surface area per unit time was readily calculated from the weight loss of the uranium, the known dimensions of the uranium cylinder and the time of the reaction. The final weight of the uranium was 141.661 grams, and, as calculated fro mthe uranium weight loss of 2.339 grams, the rate of $UF_6$ formation was 300 milligrams per hour per square centimeter of surface area.

EXAMPLE II

Same as Example I except that a 1000% stochiometric excess of a ClF₃/HF mixture in a hole ratio of 1.50 was employed. The rate of reaction was 143 mg. UF₆/hr./sq. cm.

In general, it may be said that the above examples are merely illustrative and should not be construed as limiting the scope of my invention. My invention may find application in processes for the recovery and decontamination of uranium machine turnings from associated impurities after precautions have been taken to remove materials which would react violently with the fluorinating mixture. Uranium metal, which is ductile and malleable, may be shaped and fashioned by various machine tools, and the recovery of the turnings from these operations is very desirable in view of the high cost of uranium. Furthermore, while my fluorinating mixture is particularly excellent for the conversion of uranium to uranium hexafluoride, I have found that it may also suitably be used for the fluorination of other widely differing metals such as silver and chromium. Numerous variations in operating procedures are possible without departing from the spirit of my invention. Therefore, the scope of my invention should be understood to be limited only as indicated by the appended claims.

What I claim is:

1. A process for the conversion of uranium metal directly to uranium hexafluoride, which comprises contacting said metal with a liquid mixture comprising essentially a halogen trifluoride together with hydrogen fluoride until said conversion is substantially complete.

2. A process for the conversion of uranium metal directly to uranium hexafluoride, which comprises contacting said uranium with a liquid mixture comprising essentially chlorine trifluoride together with hydrogen fluoride until said conversion is substantially complete.

3. A process for the direct conversion of uranium metal to uranium hexafluoride, which comprises contacting said metal with a liquid mixture comprising essentially chlorine trifluoride together with hydrogen fluoride in a ClF₃-HF mole ratio of about 0.15 to about 2.5 until said conversion is substantially complete.

4. A process for the direct conversion of uranium metal to uranium hexafluoride, which comprises contacting said uranium with a stoichiometric excess of a liquid mixture comprising essentially chlorine trifluoride together with hydrogen fluoride in a ClF₃-HF mole ratio of approximately 0.3, while maintaining the temperature at about 30° C., until said uranium is substantially completely converted to UF₆.

References Cited in the file of this patent

Booth et al.: Chemical Review, vol 41, pp. 421–439 (1947).

Woolf: Journal of the Chemical Society, London, 1950, pp. 3678–81.